United States Patent [19]

Ebentheuer et al.

[11] 4,418,296
[45] Nov. 29, 1983

[54] MAGNETO-GENERATOR FOR ENGINE IGNITION SYSTEMS

[75] Inventors: Hans Ebentheuer, Nuremberg; Adam Hirt, Ammerndorf, both of Fed. Rep. of Germany

[73] Assignee: Robert Bosch GmbH, Fed. Rep. of Germany

[21] Appl. No.: 318,685

[22] Filed: Nov. 5, 1981

[30] Foreign Application Priority Data

Nov. 15, 1980 [DE] Fed. Rep. of Germany ....... 3043267

[51] Int. Cl.³ .......................... H02K 11/00; F02P 1/00
[52] U.S. Cl. ................................. 310/70 R; 123/601;
310/67 R; 310/172
[58] Field of Search ............... 310/67, 70 R, 168, 169,
310/170, 182, 153, 183, 172, 67 R; 123/601;
324/163, 164, 167, 173, 177, 179

[56] References Cited

U.S. PATENT DOCUMENTS

| | | | |
|---|---|---|---|
| 3,465,739 | 9/1969 | Burson | 123/149 D |
| 3,495,579 | 2/1970 | Davalillo | 123/149 D |
| 3,732,483 | 5/1973 | Katsumata | 322/91 |
| 3,742,267 | 6/1973 | Papst et al. | 310/67 |
| 3,828,754 | 8/1974 | Carlsson | 123/149 D |
| 3,955,550 | 5/1976 | Carlsson | 123/149 D |
| 4,115,715 | 9/1978 | Mueller | 310/68 B |

*Primary Examiner*—J. D. Miller
*Assistant Examiner*—D. L. Rebsch
*Attorney, Agent, or Firm*—Frishauf, Holtz, Goodman & Woodward

[57] ABSTRACT

A magneto-generator for engine ignition has a cup-shaped pole-wheel with a multiplicity of magnet poles (13) within which is a stationary star-shaped armature having generator windings (20) on the outwardly extending pole legs. A pulse generator (24) is built in with its winding around a core (25) having one end affixed to the armature core (17) between two pole legs (18) and its other end terminating in a pole head (27) that cooperates with a projection (28) of the revolving pole-wheel to enable a control pulse to be generated by a flux derived from the same magnets that serve the generator windings.

6 Claims, 3 Drawing Figures

MAGNETO-GENERATOR FOR ENGINE IGNITION SYSTEMS

This invention concerns engine ignition magneto-generators of the kind using a cup-shaped engine driven pole-wheel of magnetically soft material carrying an array of permanent magnet poles around the inside of its rim and a stationary armature having an iron core with pole legs extending out in star shape and having their ends formed as pole faces that face the magnet poles of the revolving pole-wheel. The invention deals particularly with the provision of a control pulse generator for ignition timing control in such a magneto-generator.

In one known type of magneto-generator of this kind a control winding for generating ignition timing control pulses is affixed to one of the pole legs of the armature (see German published application DE-OS No. 15 39 205). The other pole legs carry the generator windings that serve for generating ignition energy as well as the electric power needed for lighting and other additional power consuming devices.

Such solutions have the disadvantage that the pole leg that carries the control winding can no longer be used for generating the ignition energy.

In another known magneto-generator of the kind above defined, on the other hand, all of the pole legs extending outwardly in star configuration are equipped with generator windings for supply of the ignition system and other power consuming units, and the control winding is disposed on an inwardly directed pole leg (German patent 19 37 827). The disadvantage of this solution of the problem consists in that an additional revolving control magnet must be provided on the pole wheel in the region of the generator axis so that its magnetic field will pass through the control winding. Additional space is required, moreover, for the control magnet and the control winding in the generator.

It is the object of the present invention to provide a magneto-generator in which all the pole legs of the star configuration of the armature are available for power-delivering windings and in which a control winding is provided which does not require an additional magnet for generating timing control pulses.

Briefly, the control winding is mounted on a core, one end of which is affixed to the armature in between two neighboring pole legs, and the other end of which extends actually therefrom towards the cup-bottom portion of the pole-wheel, where a projection is provided on the pole-wheel that closely approaches the control winding core piece once per pole-wheel revolution. Because of the disposition of the core piece between neighboring pole legs, the control winding is linked by the flux of the magnets mounted on the cup rim.

By this arrangement, no special magnetic field is necessary and hence, no special magnet for the control winding, and there is the further advantage that a magneto-generator of greater power rating can be provided within a relatively small external diameter.

It is particularly advantageous to affix the inner end of the core of the pulse generator in a section of a yoke ring on which the pole legs are mounted, between two neighboring pole legs. In this case an electronic circuit assembly of the ignition system can be arranged within the yoke ring in order to save space. Furthermore, with this arrangement the magnetic flux in the pulse generator can be reinforced by providing around the yoke ring on both sides of the pulse generator a short-circuiting ring, behind the adjacent pole leg with respect to the pulse generator core.

BRIEF DESCRIPTION OF THE DRAWING

The invention is further described by way of illustrative example with reference to the annexed drawings, in which.

DESCRIPTION OF THE ILLUSTRATED EMBODIMENT

Figure 1:
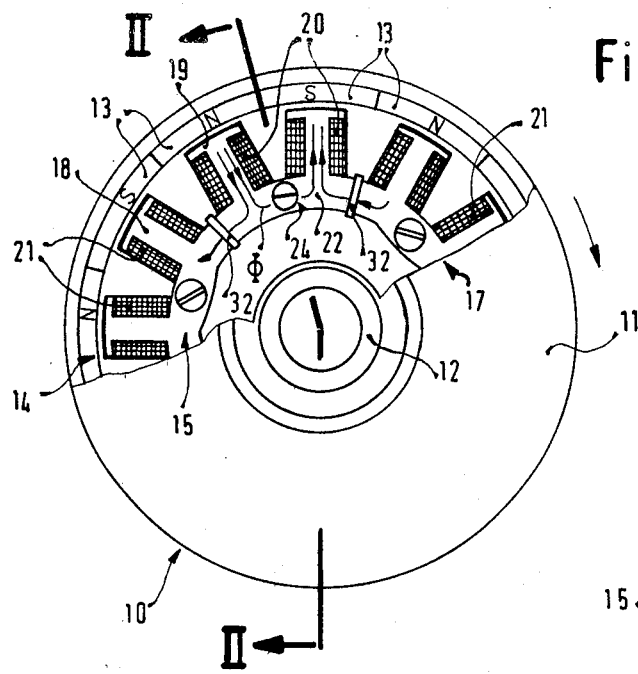
FIG. 1 is a front view with the pole-wheel bottom partly broken away and the windings shown in section, of a magneto-generator according to the invention.
Figure 2:
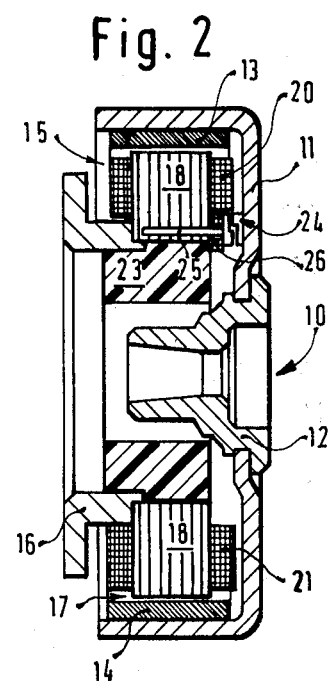
FIG. 2 is a side view of the magneto-generator in section along the line II—II of FIG. 1, which changes radial direction at the center of the device, as shown in FIG. 1.

The three figures of the drawing illustrate a magneto-generator 10 that is driven by an engine that is not shown. A pole-wheel 11 of the magneto-generator is designed to be affixed by its hub 12 to the not-shown drive shaft of the engine. Around the rim of the cup or pot shaped pole-wheel 11 of magnetically soft material such as soft iron are arranged several magnetic poles 13 in alternating sequence of polarity. The magnet poles 13 are magnetized radially into a magnet ribbon 14 that is affixed to the inside of the cup rim rising from the bottom portion of the pole-wheel. Within the pole-wheel 11 is located a stationary armature 15 having its armature plate 16 affixed to the casing of the engine. The armature plate 16 carries the iron core 17 that has pole legs 18 extending out in star configuration. The ends of the pole legs are formed as pole faces or shoes 19 which face the magnet poles 13 of the pole-wheel 11.

Generator windings 20 for generating the ignition energy and other generator windings 21 for generating the electrical energy for lighting and other electric power consumption are disposed on the pole legs 18 of the core 17. The pole legs 18 extending in star configuration are carried by a yoke ring portion 22 of the core 17. Within the yoke ring core portion 22 is an insulating plastic ring 23 in which are embedded electrical components of the ignition timing system. These electronic components for contactless ignition voltage either of the capacitor discharge or inductive energy storage type, are connected to the primary circuit of an externally located ignition coil not shown in the drawing by means of a cable, likewise not shown in the drawing. Of course the secondary circuit of the ignition coil is connected in the normal way by an ignition cable to a spark plug.

For spark timing an ignition switch, for example, a semiconductor switch, embedded in the plastic ring 23 is switched over by a control circuit. For the generation of control pulses for the control circuit, an inductive pulse generator 24 is provided, having its own core 25 around which is wound a control coil 26 which is linked with the magnetic field of the pole-wheel 11. The pulse generator core 25 has its end 25a affixed in the core 17 of the armature. Its other end forms a cylindrical pole head 27 which for a particular position of the pole-wheel 11 is located opposite a projection 28 of magnetically soft material fixed to the cup-bottom portion of the pole-wheel 11.

Figure 3:
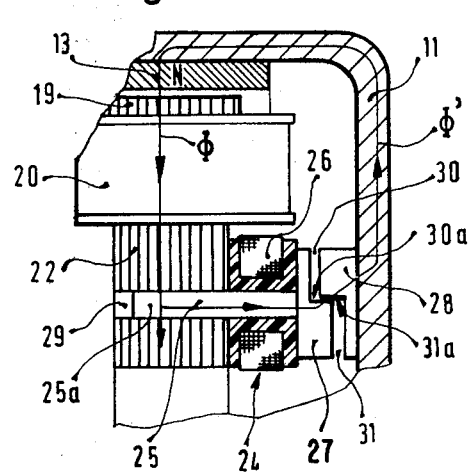
FIG. 3 is a detail view, partly in section and on a larger scale, of the portion of the magneto-generator containing the pulse generator.

The end 25a of the pulse generator core 25 is pressed into a bore 29 made in a section of the yoke ring core portion 22 situated between two neighboring pole legs 18 of the armature core. The pole-head 27 has a step cut out 30 of which the riser is a chord plane of the cylindrical head that provides the pole surface 30a that cooperates in the pulse generation function with the pole surface 31a (see FIG. 3) of the chord step 31 of the similarly cylindrical head of the projection 28 set in the cup-bottom portion of the pole-wheel 11.

The yoke ring portion 22 of the iron core 17 carries short-circuiting rings 32, one on each side of the pulse generator 24, in each case on the other side of the adjacent pole leg 18 from the pulse generator core 25. These short-circuiting rings 32 have the function of reinforcing the magnetic flux of the yoke ring 22 core portion which the pulse generator 24 is affixed.

The manner of operation of the magneto-generator 10 will now be further described. As soon as the pole-wheel 11, driven by the engine not shown in the drawing, revolves in the direction shown by an arrow, the pole legs 18 are penetrated by a continuously changing magnetic flux by means of the magnet poles 13 of the pole-wheel 10. This changing flux induces an alternating voltage in the generator windings 20, 21. The alternating voltage generated in the generator windings 20 is used to supply current to the ignition system. As shown in FIG. 1, the magnetic flux which traverses one of the pole legs 18 divides in the yoke ring portion 22 of the iron core 17 in such a way that a partial flux Φ is deflected over to the pole leg adjacent on the right hand and another flux portion is similarly guided over to the neighboring pole leg on the left. As soon as, by the rotation of the pole-wheel 11, the projection 28 on the cup-bottom of the pole-wheel 11 is moved past the pole head 27 of the pulse generator 24, some of the flux portion Φ is diverted over to the pulse generator 24, this diverted part being designated as the control flux Φ'. As can be seen from FIG. 3, this control flux Φ' passes through the pulse generator 25 to the pole head 27 and from there over a working air gap to the projection 28 of the pole-wheel 11. This flux returns through the pole-wheel 11 to the magnet pole 13. As the projection 28 moves past the pole head 27 of the pulse generator 24 this control flux Φ' briefly passes through the coil 26, so that there, two successive and oppositely polarized control pulses are induced for timing the ignition system. This sequence of events is repeated with each full revolution of the pole-wheel 11.

Since a flux portion also passes through each of the two short-circuiting rings 32, a voltage is induced in them that drives a short-circuit current. This short-circuit current in turn generates a magnetic field that is directed oppositely to the flux portion in question, which has the consequence that the magnetic flux Φ in the yoke ring core portion 22 bwtween the two pole legs 18 carrying generator windings 20 is reinforced, to the extent that the flux through the short-circuiting rings 32 into the neighboring regions of the yoke ring 22 core portion is weakened. By this arrangement the control flux Φ' and thereby also the power of the control pulses delivered by the pulse generator 24 are amplified.

The invention is not limited to the illustrated embodiment, since both the pulse generator 24 and also the projection 28 of the pole-wheel 11 can be otherwise constituted and otherwise arranged. Furthermore, instead of a core having a closed yoke ring portion 22 a differently shaped iron core can be used. What is essential for the invention is that a pulse generator core that carries the control windings and has one end connected to the iron core of the armature is fixed at that end in a section of the armature lying between two neighboring pole legs, and has its other end located so as to stand opposite to a projection of magnetically soft material affixed to the revolving pole-wheel for at least one position of the wheel in its revolution.

We claim:

1. A magneto-generator for engine ignition systems comprising:
   a cup-shaped revolving pole-wheel of magnetically soft material disposed for being driven by an engine;
   a multiplicity of permanently magnetized magnet poles disposed around the inner rim of said pole-wheel in alternating sequence of polarity;
   a stationary armature having an iron core (17) provided with substantially straight radial pole legs (18) extending in star configuration having their respective outer ends constituted as pole faces facing said magnet poles of said pole-wheel;
   electric generator windings around said pole legs (18) for providing electrical energy for engine ignition and for other electric power consuming devices;
   an inductive pulse generator affixed to said armature for generating ignition timing control pulses and constituted by an elongated core piece (25,27) extending from said armature core towards the cup-bottom portion of said pole wheel and a winding around said core piece which is linked by the magnetic field of said pole-wheel,
   said core piece (25) having one end (25a) adjoining said armature core (17) and affixed to a portion (22) thereof lying between two neighboring pole legs (18) of said armature core and said core piece also having its other end (27) extending axially towards the cup-bottom portion of said pole-wheel (11), and
   a projection of magnetically soft material on said cup-bottom portion of said pole-wheel extending inwards for close approach once per pole-wheel revolution to said extending end (27) of said core piece (25).

2. A magneto-generator as defined in claim 1 in which said armature core (17) has a yoke ring portion (22) from which said pole legs extend away in star configuration away, and in which said pulse generator core piece (25) has its inner end (25a) fixed in said yoke ring core portion.

3. A magneto-generator as defined in claim 2 in which two short-circuiting rings (32) are provided encircling said yoke ring core portion, one on either side of said pulse generator (24), in each case behind the nearest pole leg (18) with respect to said pulse generator (24), whereby the magnetic flux in said pulse generator is increased.

4. A magnet-generator as defined in claim 1 in which said pulse generator core piece (25) is in the form of a pin or stud having one end (25a) in a bore (29) in said armature core (17) and having its other end formed to provide a cylindrical pole head (27), by which said projection (28) of said pole-wheel (11) passes once per pole-wheel revolution.

5. A magneto-generator as defined in claim 4 in which said cylindrical pole-head (27) has a pole surface (30a) provided by a chord-shaped step cutaway (30) provided on said pole-head (27).

6. A magneto-generator as defined in claim 5 in which said projection (28) on said cup-bottom portion of said pole-wheel (11) is in the shape of a cylindrical head with a chord-shaped step cutaway (31) providing a pole surface (31a) that cooperates with the corresponding pole surface (30a) of said pole-head (27) of said pulse generator core (25).

* * * * *